(12) United States Patent
Kobayashi

(10) Patent No.: US 8,136,817 B2
(45) Date of Patent: Mar. 20, 2012

(54) MOTOR WITH CUTTING TOOL MOUNTING HOLE

(75) Inventor: Kiyoto Kobayashi, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 307 days.

(21) Appl. No.: 12/663,875

(22) PCT Filed: Jun. 20, 2007

(86) PCT No.: PCT/JP2007/000648
§ 371 (c)(1),
(2), (4) Date: Dec. 10, 2009

(87) PCT Pub. No.: WO2008/155796
PCT Pub. Date: Dec. 24, 2008

(65) Prior Publication Data
US 2010/0183392 A1   Jul. 22, 2010

(51) Int. Cl.
*F16J 15/447* (2006.01)
*F16J 15/00* (2006.01)
*H02K 5/10* (2006.01)
*B23Q 5/10* (2006.01)

(52) U.S. Cl. .................. 277/412; 277/346; 310/88

(58) Field of Classification Search .............. 277/346, 277/412; 310/88, 90
See application file for complete search history.

(56) References Cited

U.S. PATENT DOCUMENTS

| | | | | |
|---|---|---|---|---|
| 5,570,980 | A | * | 11/1996 | Nakamura et al. ............ 409/232 |
| 6,181,513 | B1 | | 1/2001 | Obara |
| 7,055,825 | B2 | * | 6/2006 | Watanabe et al. ............. 277/349 |
| 7,462,967 | B2 | | 12/2008 | Maruyama et al. |
| 7,722,050 | B2 | * | 5/2010 | Roddis ......................... 277/378 |
| 2005/0046122 | A1 | * | 3/2005 | Ernst ............................. 277/628 |
| 2006/0250038 | A1 | * | 11/2006 | Rea et al. ....................... 310/88 |

FOREIGN PATENT DOCUMENTS

JP   11-328835 A   11/1999

(Continued)

OTHER PUBLICATIONS

International Search Report (PCT/ISA/210) for PCT/JP2007/000648 mailed Oct. 9, 2007.

*Primary Examiner* — Burton Mullins
(74) *Attorney, Agent, or Firm* — Buchanan Ingersoll & Rooney PC

(57) ABSTRACT

A tool holder plate (51) is fixed to a shaft end part (413) of a hollow motor shaft (41) of a brushless DC servo motor (1), and a cutting tool is mounted in a tool mounting hole (51a) formed in the tool holder plate (51) and a work is cut-processed by this cutting tool. In order to prevent intrusion of a cutting processing oil containing cutting powder into the inside of the motor from between the shaft end part (411) of the hollow motor shaft (41) and an end plate portion (22) of a motor housing (2), a labyrinth seal (55) including a double circular groove (553, 555) having a fine width extended in the axis direction (1a) is formed between a metal plate (53), the tool holder plate (51), and the shaft end part (411). The other shaft end part (414) is also formed with a labyrinth seal (56) of the same structure. Due to this structure, intrusion of the cutting processing oil into the inside of the motor can be prevented, which can prevent trouble such as early destruction of oil seals (48, 49) by attachment of the cutting powder contained in the cutting processing oil to the oil seals (48, 49).

5 Claims, 4 Drawing Sheets

FOREIGN PATENT DOCUMENTS

| | | |
|---|---|---|
| JP | 2001-268859 A | 9/2001 |
| JP | 2002-010566 A | 1/2002 |
| JP | 2002-369474 A | 12/2002 |
| WO | WO 2005/013463 A1 | 2/2005 |

* cited by examiner

MOTOR WITH CUTTING TOOL MOUNTING HOLE

TECHNICAL FIELD

The present invention relates to a motor for rotatably driving a cutting tool securely linked to a tool mounting hole, wherein the tool mounting hole is formed in a shaft end part of a motor shaft exposed from an end surface of a motor housing. More specifically, the present invention relates to a motor comprising a cutting-oil-resistant structure for preventing cutting processing oil containing cutting powder from entering the motor from between the motor housing and the shaft end part of the motor shaft during a cutting operation.

BACKGROUND ART

In Patent Document 1, the applicant has previously provided a flat, hollow brushless servo motor for performing a cutting process, wherein a cutting tool is mounted on both ends of a motor shaft and a workpiece is pressed from both sides.

[Patent Document 1] WO 2005/013463 Pamphlet

With a workpiece cutting tool that uses a brushless motor of this configuration, a cutting process is performed by the cutting tool while cutting processing oil is supplied to the workpiece in a position adjacent to the motor. Therefore, the cutting processing oil readily enters the motor from a shaft end part of the motor shaft. The cutting processing oil contains a large quantity of metal cutting powder produced by the cutting process. When metal cutting powder mixes in with the cutting processing oil and enters the motor, motor coil ground faults, insulation problems, and other adverse events readily occur more quickly than during use under normal usage circumstances. In view of this, an oil seal or another flexible contact seal is installed between the motor shaft and the motor housing in order to prevent the metal powder and other impurities undesirably combining with the cutting processing oil.

However, in this case, the metal cutting powder comes into direct contact with the contact portion between the contact seal and the outer periphery surface portion of the motor shaft. As a result, the portion (lip) in the contact seal in contact with the motor shaft is quickly abraded and damaged by contact with the metal cutting powder, and its longevity is extremely shortened.

DISCLOSURE OF THE INVENTION

In view of these circumstances, an object of the present invention is to provide a motor comprising a cutting tool mounting hole capable of preventing metal cutting powder and other impurities from entering the interior.

Another object of the present invention is to provide a motor comprising a cutting tool mounting hole capable of preventing metal cutting powder from adhering to an oil seal or another contact seal incorporated between the motor shaft and the motor housing.

In order to achieve the objects described above, a motor with a cutting tool hole of the present invention is characterized in comprising:

a cylindrical motor housing sealed at both ends in an axial direction;

a through-hole formed in the center of at least one end plate portion of the motor housing;

a motor shaft in which one shaft end part is exposed through the through-hole;

a tool mounting hole formed in the center portion of an end surface of the shaft end part in the motor shaft;

a bearing for supporting the motor shaft in a manner that allows the motor shaft to rotate relative to the end plate portion, the bearing being installed between an inner periphery edge end of the through-hole in the end plate portion and an outer periphery surface portion of the shaft end part of the motor shaft;

an annular contact seal having a flexible material for sealing the space between the inner periphery edge end of the through-hole and the outer periphery surface portion of the shaft end part in a position axially outside of the bearing;

an annular seal plate having a rigid material fixed to the end plate portion in a position axially outside of the contact seal so as to conceal the space between the inner periphery edge end of the through-hole and the shaft end part;

and a labyrinth seal for preventing the ingress of cutting processing oil, the labyrinth seal being formed between the seal plate and the shaft end part of the motor shaft.

In the motor with a cutting tool mounting hole of the present invention, a labyrinth seal for inhibiting the ingress of cutting processing oil is disposed on the external side of the contact seal. In cases in which cutting processing oil having metal cutting powder or another cutting powder combined therewith enters the motor interior along the outer periphery surface of the motor shaft, the labyrinth seal reliably traps the cutting powder contained therein, particularly cutting powder comparatively large in size. Therefore, it is possible to prevent or minimize the incidence of adverse effects in which cutting processing oil containing comparatively large-sized cutting powder reaches the oil seal or other contact seal, and contact with the cutting powder causes the contact seal to be quickly damaged.

In cases in which a circular inner periphery end surface which coaxially encircles the circular outer periphery surface portion of the shaft end part of the motor shaft is formed in the seal plate, the labyrinth seal can be formed using an extremely narrow circular groove formed between the circular inner periphery end surface and the circular outer periphery surface portion and extending in the axial direction.

With a labyrinth seal of this configuration, comparatively large-sized cutting powder and other impurities contained in the cutting processing oil can be removed while the cutting processing oil which has entered from the motor exterior is passing through the extremely narrow annular groove.

The following configuration is preferably used for the labyrinth seal in order to ensure that ultrafine cutting powder and other impurities contained in the cutting processing oil do not pass through the labyrinth seal together with the cutting processing oil and reach the contact seal.

Specifically, formed in the seal plate are an annular plate portion which broadens in the radial direction and a cylindrical portion which extends bent at a right angle in the axial direction from the inner periphery edge of the annular plate portion, and a circular groove of a fixed width through which the cylindrical portion of the seal plate is coaxially inserted is formed in the shaft end part of the motor shaft. An extremely narrow circular groove for guiding the cutting processing oil along the axial direction in a first direction is thereby formed in the inner periphery side of the cylindrical portion inserted into the circular groove, and an extremely narrow circular groove for leading the cutting processing oil along the axial direction in a second direction opposite the first direction is formed in the outer periphery side of the cylindrical portion inserted into the circular groove. These circular grooves communicate with each other via a communicating groove which is broader than the circular grooves.

Thus, in the case of a labyrinth seal having two concentric and extremely narrow annular grooves, cutting processing oil that has passed through one annular groove along the axial direction then passes through the other extremely narrow annular groove in the opposite direction along the axial direction. Therefore, ultrafine cutting powder is also reliably trapped in the labyrinth seal. Consequently, ultrafine cutting powder can be inhibited or prevented from passing through the contact seal and entering the motor interior. As a result, ground faults in the motor coil, insulation problems, and other harmful effects caused by cutting powder entering the motor can be minimized or prevented, and its longevity can be improved.

A labyrinth seal having two annular grooves of such description can be configured in the following manner, using the shaft end part of the motor shaft and an annular holder plate fixed thereto for holding the cutting tool.

Specifically, formed in the seal plate are an annular plate portion which broadens in the radial direction and a cylindrical portion which bends at a right angle toward the motor interior from the inner periphery edge of the annular plate portion and extends along the axial direction. An annular holder plate for holding the cutting tool is coaxially fixed to the shaft end part of the motor shaft. Furthermore, a circular groove of a fixed width through which the cylindrical portion of the seal plate is coaxially inserted is formed between the shaft end part and the annular holder plate.

An extremely narrow circular groove for directing the cutting processing oil along the axial direction in a first direction is formed in the inner periphery side of the cylindrical portion inserted into the circular groove, an extremely narrow circular groove for leading the cutting processing oil along the axial direction in a second direction opposite the first direction is formed in the outer periphery side of the cylindrical portion inserted into the circular groove, and these circular grooves communicate with each other via a communicating groove which is broader than the circular grooves.

In this case, it is possible to adopt a configuration wherein a circular groove which extends in the radial direction and is broader than the extremely narrow cylindrical grooves extending in the axial direction is formed between the annular holder plate and the seal plate, and the circular groove extending in the radial direction communicates with one of the extremely narrow circular grooves extending in the axial direction.

BEST MODE FOR CARRYING OUT THE INVENTION

Embodiments of a motor comprising the cutting tool mounting hole to which the present invention is applied are described hereinbelow with reference to the drawings.

Figure 1C:
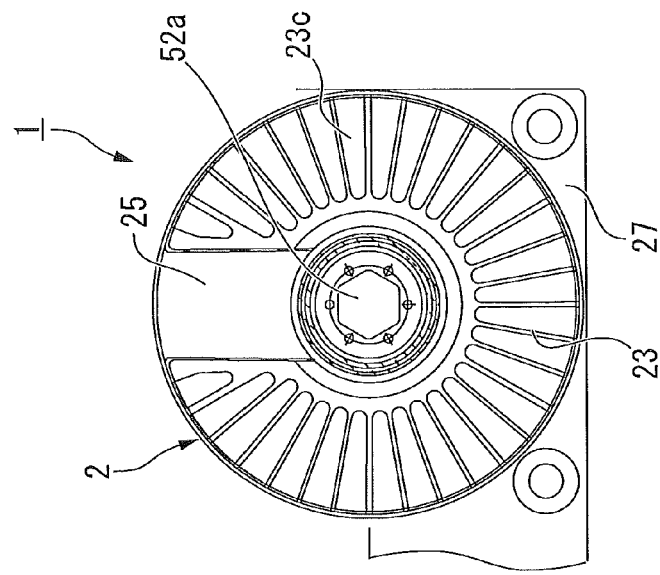
FIG. 1C is an end surface view showing the end surface on the opposite side of the motor in FIG. 1A.
Figure 1A:
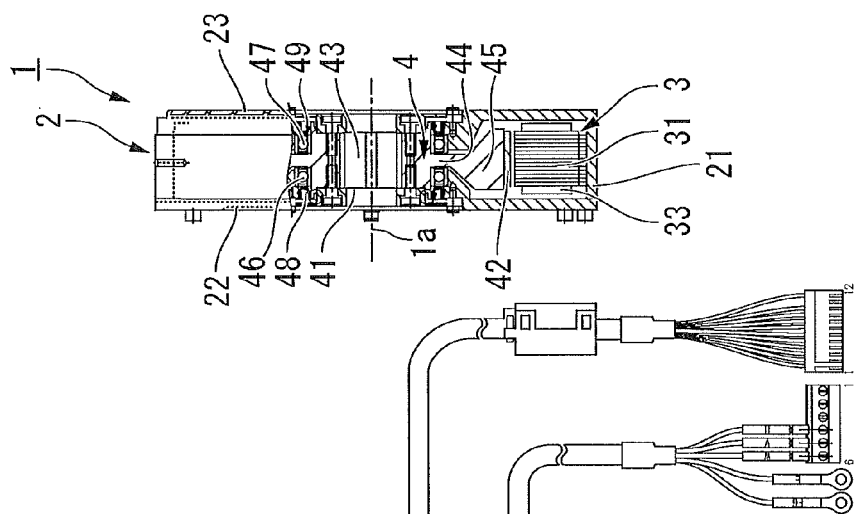
FIG. 1A is a schematic cross-sectional view showing a brushless DC servo motor to which the present invention is applied.
Figure 1B:
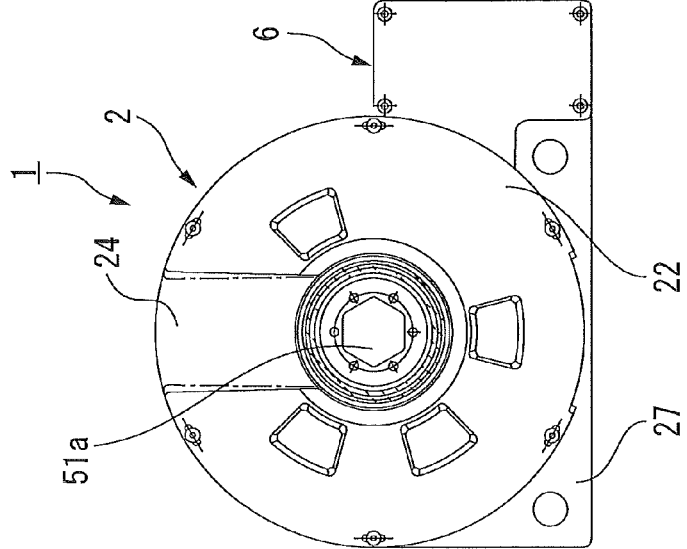
FIG. 1B is an end surface view of the motor in FIG. 1A.
Figure 2:
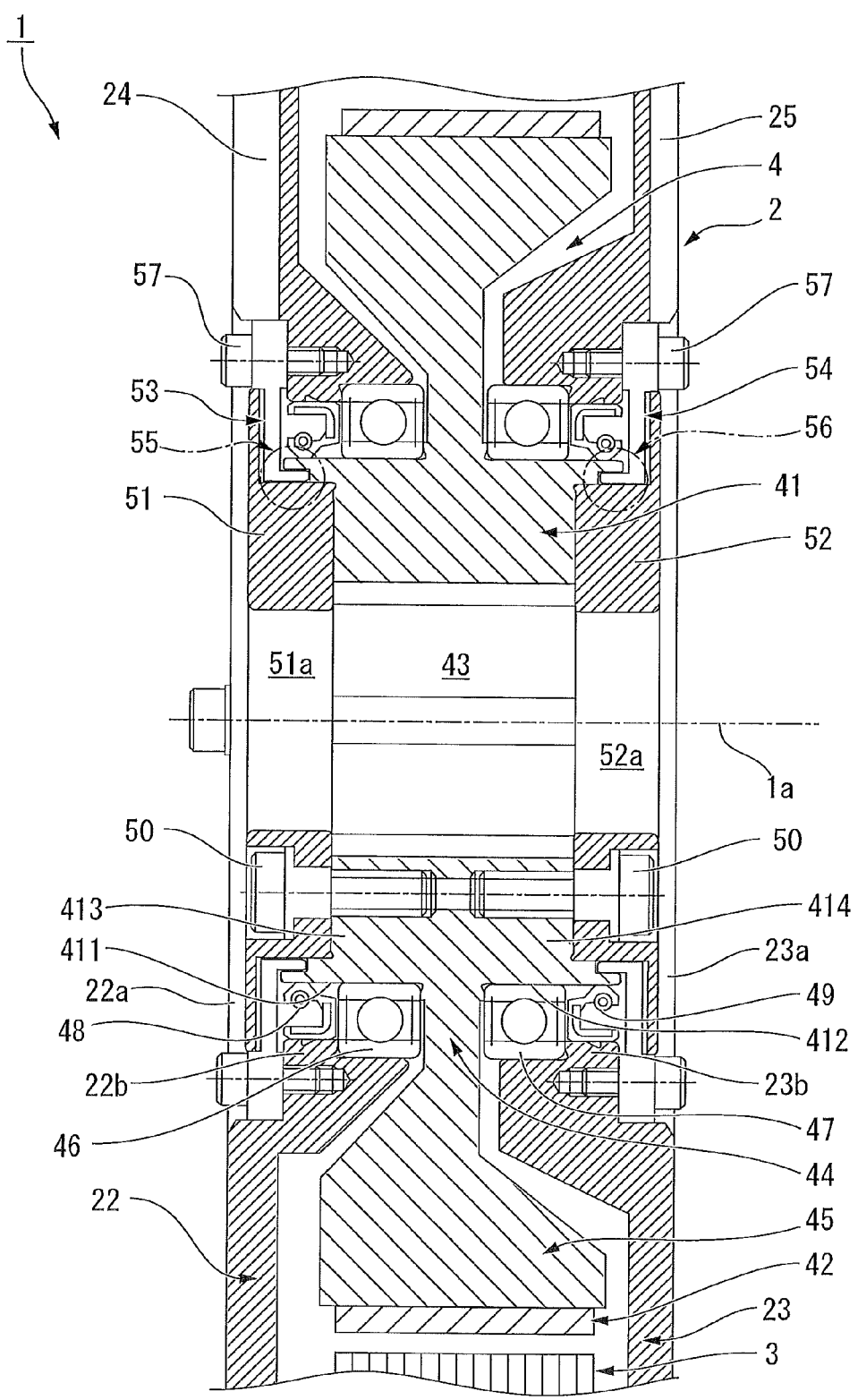
FIG. 2 is an enlarged partial cross-sectional view showing the center portion of the motor in FIG. 1A.

FIG. 1A is a schematic cross-sectional view of a brushless DC servo motor comprising a cutting tool mounting hole according to the present embodiment. FIGS. 1B and 1C are end surface views thereof. FIG. 2 is a partial enlarged cross-sectional view showing an enlargement of the center portion thereof.

A brushless DC servo motor 1 according to the present embodiment has a flat, cylindrical motor housing 2 sealed at both ends. A stator assembly 3 and a rotor assembly 4 are concentrically incorporated in the interior of the motor housing 2.

The stator assembly 3 comprises a ring core 31 composed of a magnetic material, and a drive coil 33 wound via an insulator around a salient pole portion of the ring core 31; and the stator assembly 3 is mounted coaxially on the inner periphery surface of a flat, cylindrical trunk 21 of the motor housing 2. The stator assembly 3 has a 20-pole, 24-slot configuration, for example.

The rotor assembly 4 is disposed concentrically on the inside of the stator assembly 3. The rotor assembly 4 comprises a hollow motor shaft 41 (rotor shaft) and a ring magnet 42 fixed to the circular outer periphery surface of the hollow motor shaft 41. The ring magnet 42 faces the stator assembly 3 across a small gap. In the hollow motor shaft 41, a through-hole 43 is formed in the center, a narrow, annular linking part 44 in the outer periphery surface protrudes radially outward from the center of an axial direction 1a, and a broad magnet installation part 45 on which the ring magnet 42 is installed is formed in the outer periphery end of the annular linking part 44.

Circular through-holes 22a, 23a are formed in the centers of end plate portions 22, 23 on either side of the motor housing 2. Circular inner periphery edges 22b, 23b of the end plate portions 22, 23, which define the circular through-holes 22a, 23a, have cross-sectional shapes protruding in a direction facing the annular linking part 44 of the hollow motor shaft 41. Ball bearings 46, 47 are placed between the circular inner periphery edges 22b, 23b and circular outer periphery surface portions 411, 412 facing these edges on the sides of the annular linking part 44 in the hollow motor shaft 41. The hollow motor shaft 41 is rotatably supported via the ball bearings 46, 47 by the left and right end plate portions 22, 23. Annular oil seals (contact seals) 48, 49 are installed on the outer sides of the ball bearings 46, 47, between the circular inner periphery edges 22b, 23b of the left and right end plate portions 22, 23 and the circular outer periphery surface portions 411, 412 of the hollow motor shaft 41.

Annular tool holder plates 51, 52 are coaxially fixed by fastening bolts 50 to shaft end parts 413, 414 on the two sides of the hollow motor shaft 41. Hexagonal tool mounting holes 51a, 52a are formed in the centers of the tool holder plates 51, 52.

Annular metal plates 53, 54 (seal plates) are coaxially disposed between the shaft end parts 413, 414 of the hollow motor shaft 41 and the tool holder plates 51, 52, respectively. A labyrinth seal 55 for preventing cutting processing oil from entering the motor interior from the exterior is formed between the shaft end part 413 of the hollow motor shaft 41, the tool holder plate 51, and the metal plate 53. Similarly, a labyrinth seal 56 is formed between the other shaft end part 414, the tool holder plate 52, and the metal plate 54.

The motor housing 2 has, as described above, the flat cylindrical trunk 21 as well as the end plate portion 22 and end plate portion 23 that seal the ends thereof; and the circular through-holes 22a, 23a are formed in the centers of these end plate portions 22, 23. The tool holder plates 51, 52 fixed to the shaft end parts 413, 414 of the hollow motor shaft 41 are exposed through these circular through-holes 22*a*, 23*a*.

In the outside surfaces of the left and right end plate portions 22 and 23 of the motor housing 2 are formed first and second workpiece insertion recesses 24, 25 of a specified depth, comprising circular regions concentrically including the circular through-holes 22*a*, 23*a*, and regions which continue from these circular regions and radially extend to the outer periphery edges of the end plate portions, as can be seen in FIGS. 1B and 1C. These workpiece insertion recesses 24, 25 are formed by reducing the thickness of end plate portions 22, 23 to a specified width. The length of the hollow motor shaft 41 in the axial direction 1*a* is equal to or less than the thickness between the bottom surfaces of these workpiece insertion recesses 24, 25, and in the present example, the shaft end surfaces on the sides of the hollow motor shaft 41 substantially coincide with the bottom surfaces of the recesses 24, 25.

Mounted to the outer periphery surface portion of the cylindrical trunk 21 of the motor housing 2 is a lead wire laying area 6 for laying a lead wire from the drive coil 33 and a sensor (not shown) to the motor exterior. The lead wire laying area 6 protrudes radially outward from the outer periphery surface portion of the cylindrical trunk 21 of the motor housing 2, and has a thickness that fits within the thickness dimension of the axial direction 1*a* of the motor housing 2.

The motor housing 2 of the present example has a structure in which the cylindrical trunk 21 and the end plate portion 23 are integrally formed, and the end plate portion 22 is securely fastened to an annular end surface of the cylindrical trunk 21. A mounting flange 27 extends toward the external side in the radial direction from the outer periphery surface portion of the cylindrical trunk 21, and the motor 1 is fixed to a fixed side portion (not shown) by the mounting flange 27. Furthermore, an external side surface 23*c* of the end plate portion 23 is a heat-dissipating surface on which an uneven surface is radially formed.

Figure 3:
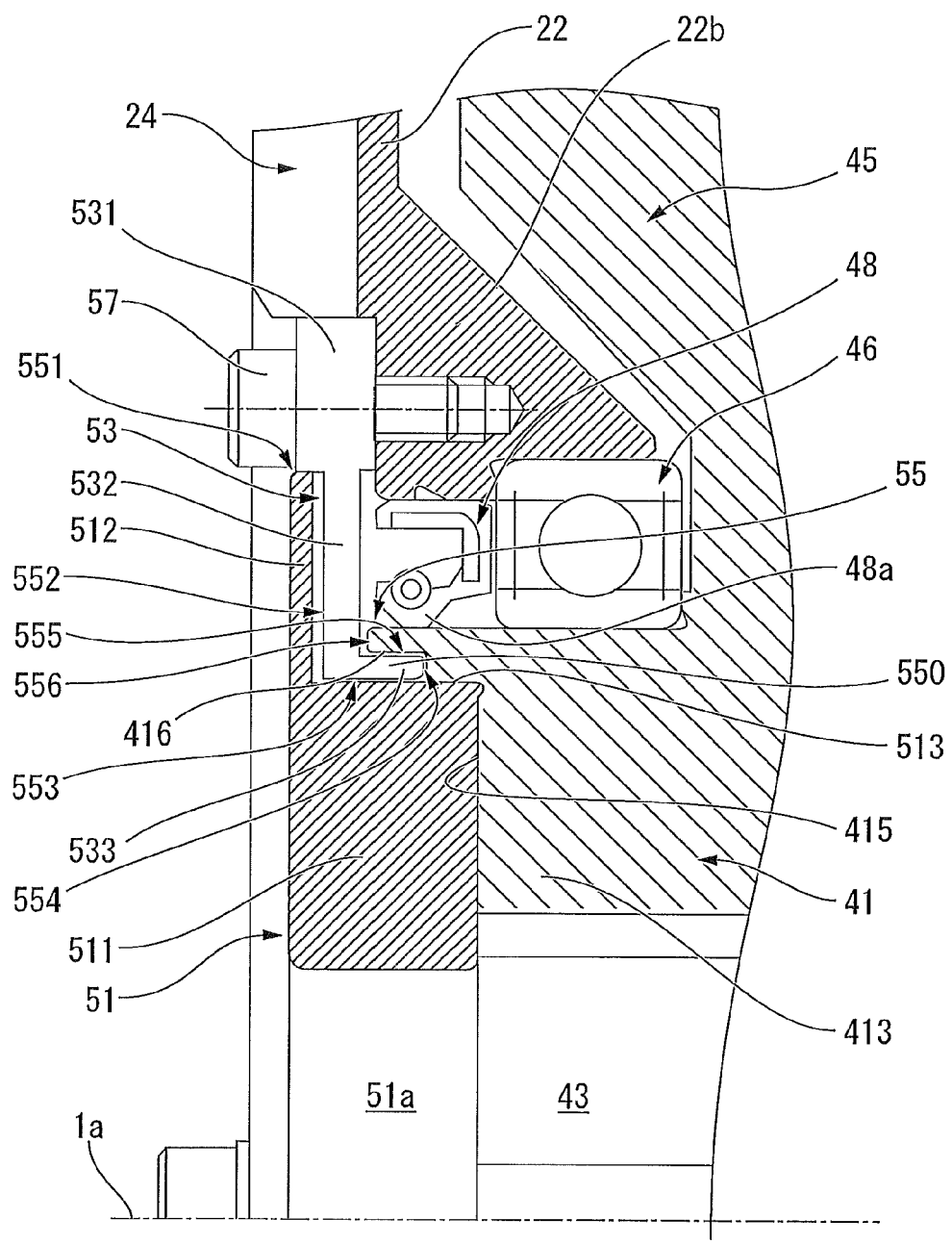
FIG. 3 is a partial enlarged cross-sectional view showing a further enlargement of the area in which the labyrinth seal is formed in FIG. 2.

FIG. 3 is a partial enlarged cross-sectional view showing a portion of the labyrinth seal 55 formed in the shaft end part 413 of the hollow motor shaft 41. The structure of the labyrinth seal 55 is described with reference to FIGS. 2 and 3. The other labyrinth seal 56 has a symmetrical structure and a description thereof is omitted.

The labyrinth seal 55 is formed between the shaft end part 413 of the hollow motor shaft 41, the tool holder plate 51, and the metal plate 53. Formed in the shaft end part 413 of the hollow motor shaft 41 is a circular recess 415 whereby the tool holder plate 51 is coaxially installed from the side of the end surface of the shaft end part.

The tool holder plate 51 comprises an annular portion 511 mounted in the circular recess 415, and an annular plate portion 512 expanding outward in the radial direction from the outer periphery edge of the external end surface of the annular portion 511. In this state in which the tool holder plate 51 has been mounted, a circular groove 550 of a specified width is formed between a circular inner periphery surface 416 in the open side of the circular recess 415 of the shaft end part 413 of the hollow motor shaft 41, and a circular outer periphery surface 513 of the tool holder plate 51.

The metal plate 53 comprises a thick annular boss 531, a thin annular plate portion 532 extending inward in the radial direction from the inner periphery surface of the boss 531, and a cylindrical portion 533 bent at a right angle to the inside of the motor from the inner periphery edges of the annular plate portion 532 and extending along the axial direction 1*a*. The boss 531 is securely fastened by a fastening bolt 57 to the outer periphery end surface portion of the inner periphery edge 22*b* in the end plate portion 22 of the motor housing 2.

The annular plate portion 532 of the metal plate 53 is disposed facing the internal end surface of the annular plate portion 512 of the tool holder plate 51 across a specified gap. The cylindrical portion 533 extending from the inner periphery edges of the annular plate portion 532 is coaxially inserted into the circular groove 550 formed between the tool holder plate 51 and the shaft end part 413 of the hollow motor shaft 41.

The circular outer periphery end surface of the annular plate portion 512 of the tool holder plate 51 extends to the vicinity of the boss 531 of the metal plate 53, between which is formed an extremely narrow first circular groove 551 extending in the axial direction 1*a*. A second circular groove 552 broader than the circular groove 551 and extending in the radial direction is formed between the annular plate portion 512 of the tool holder plate 51 and the annular plate portion 532 of the metal plate 53 facing the plate portion 512, and the outer periphery end of the second circular groove 552 communicates with the first circular groove 551.

An extremely narrow third circular groove 553 extending in the axial direction 1*a* is formed between the circular outer periphery surface 513 of the annular portion 511 of the tool holder plate 51 and the cylindrical portion 533 of the metal plate 53, and the axially external end of the third circular groove 553 communicates with the inner periphery end of the second circular groove 552. A fourth circular groove 554 broader than the third circular groove 553 and extending in the radial direction is formed between the circular distal end surface of the cylindrical portion 533 and the circular end surface which defines the bottom surface of the circular groove 550, and the fourth circular groove 554 communicates with the internal end of the third circular groove 553.

Furthermore, an extremely narrow fifth circular groove 555 extending in the axial direction 1*a* is also formed between the circular outer periphery surface of the cylindrical portion 533 and the circular inner periphery surface 416 of the shaft end part 413. The internal end of this fifth circular groove 555 communicates with the fourth circular groove 554. A sixth circular groove 556 broader than the fifth circular groove 555 and extending in the radial direction is formed between the internal end surface of the annular plate portion 532 of the metal plate 53 and the annular end surface of the shaft end part 413 which faces the first end surface, and the sixth circular groove 556 communicates with the external end of the fifth circular groove 555. The sixth circular groove 556 communicates with the portion where the oil seal 48 is installed.

The labyrinth seal 55 is formed by the first through sixth circular grooves 551 to 556 configured in this manner.

In the brushless DC servo motor 1 according to the present embodiment, motor structural components are incorporated into the flat, cylindrical motor housing 2, and a cutting tool (not shown) can be mounted directly in the tool mounting holes 51*a*, 52*a* of the tool holder plates 51, 52 mounted to the shaft end parts 413, 412 of the hollow motor shaft 41 exposed from the through-holes 22*a*, 23*a* of the end plate portions 22, 23. The workpiece insertion recesses 24, 25 are also formed in the external surfaces of the end plate portions 22, 23 of the motor housing 2, whereby a portion of low thickness in the axial direction 1*a* is formed in the motor housing 2, and a workpiece (not shown) having an opposing portion in a gap narrower than the axial width of the motor housing 2 can be inserted into the end portions (the positions machined by the cutting tool) of the tool mounting holes 51*a*, 52*a* from the external sides of the motor 1 in the radial direction.

Furthermore, the thickness of the end plate portion 22 of the motor housing 2 is reduced, a recessed groove 26 for laying a lead wire is formed, and the lead wire laying area 6 is fitted inside the thickness dimension of the motor housing 2. Therefore, an extremely flat, hollow brushless DC servo motor can be obtained.

When the workpiece is being cut-processed, the cut-processing is performed by the cutting tool in the vicinity of the external side of the shaft end part 413 of the hollow motor shaft 41, and the shaft end part 413 is therefore exposed to a large quantity of cutting processing oil. When a large quantity of cutting powder gets entrained with the cutting processing oil and the cutting powder enters the motor interior, ground faults and insulation problems in the drive coil 33 readily occur.

However, the labyrinth seal 55 having the configuration described above is formed in the shaft end part 413. The extremely narrow third circular groove 553 and fifth circular groove 555 extending in the axial direction are concentrically formed in the labyrinth seal 55. In cases in which the cutting processing oil containing cutting powder enters from the exterior, the powder flows from the first circular groove 551 into the third circular groove 553 via the second circular groove 552. The cutting processing oil flowing along the third circular groove 553 in the axial direction 1a flows into the external fifth circular groove 555 via the fourth circular groove 554, where the oil then flows in the opposite direction along the axial direction 1a. The oil then passes through the sixth circular groove 556 and reaches the portion where the oil seal 48 is installed. As the cutting processing oil passes through this route, the cutting powder contained in the cutting processing oil gets trapped in the circular grooves. A large portion of the cutting processing oil is also blocked from entering before reaching the oil seal 48.

As a result, it is possible to reliably prevent the cutting processing oil containing the cutting powder from reaching the oil seal 48, and the lip 48a in contact with the hollow motor shaft 41 in the oil seal 48 from being quickly damaged by the cutting powder. The cutting processing oil can also be reliably prevented from entering the motor interior; e.g., to the ball bearings 46 or the like.

Other Embodiments

Figure 4:
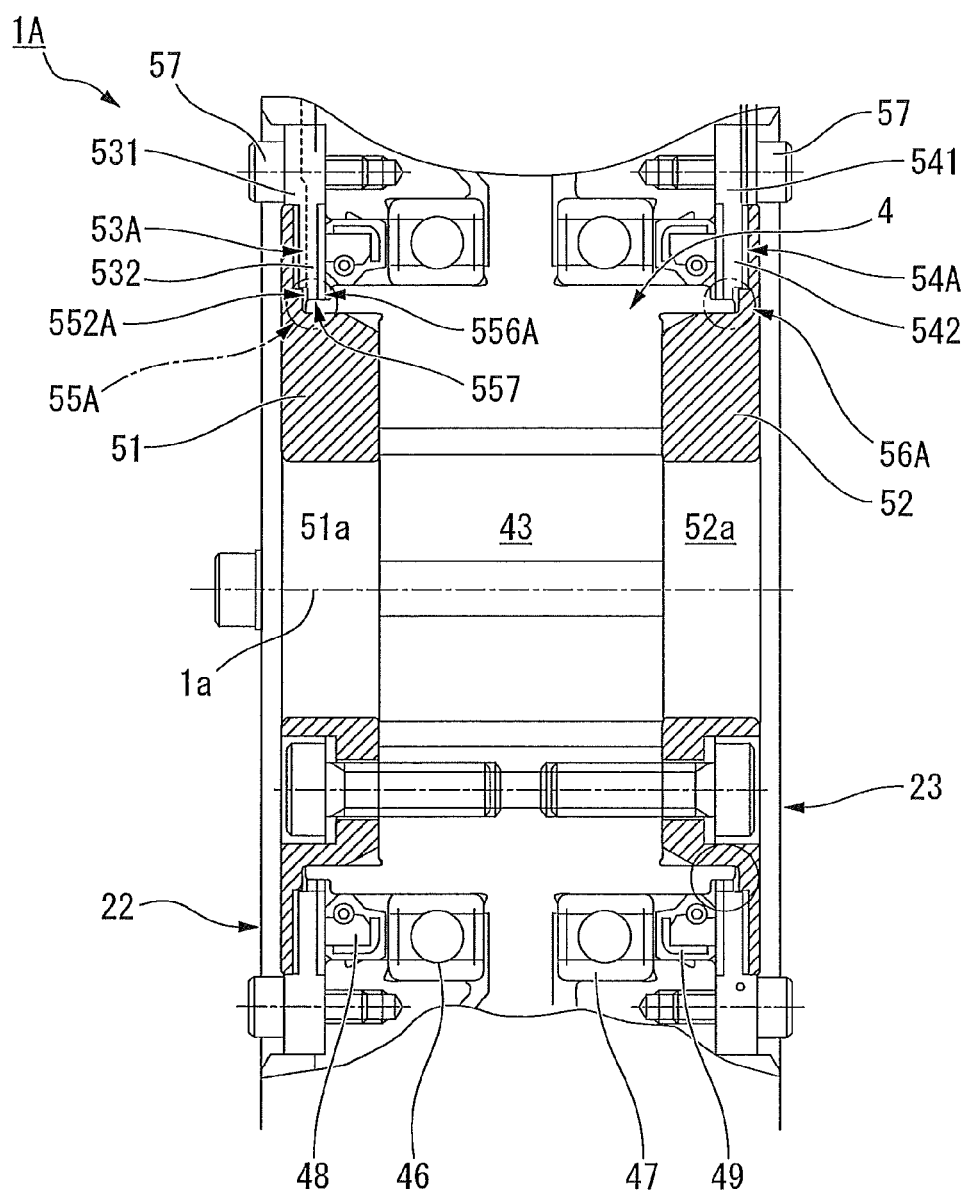
FIG. 4 is an enlarged partial cross-sectional view showing another example of the structure of the motor shaft end part.

FIG. 4 is a partial cross-sectional view showing another example of the present invention. The essential configuration of the brushless DC motor 1A shown in this drawing is identical to that of the case described above, and corresponding components are therefore denoted by the same numerical symbols and are not described. In the motor 1A of the present example, metal plates 53A, 54A are not provided with cylindrical portions. Therefore, labyrinth seals 55A, 56A each include a second circular groove 552A, a single extremely narrow circular groove 557 extending in the axial direction 1a, and a sixth circular groove 556A. Providing the labyrinth seals 55A, 56A having this configuration is also effective for preventing the ingress of cutting processing oil containing cutting powder, and particularly for preventing large-sized cutting powder from reaching the oil seal.

The invention claimed is:

1. A motor with a cutting tool mounting hole, characterized in comprising:
a cylindrical motor housing sealed at both ends in an axial direction thereof;
a through-hole formed in a center of at least one end plate portion of the motor housing;
a motor shaft in which one shaft end part thereof is exposed through the through-hole;
a cutting tool mounting hole formed in a center portion of an end surface of the shaft end part in the motor shaft;
a bearing for supporting the motor shaft in a manner that allows the motor shaft to rotate relative to the end plate portion, the bearing being installed between an inner periphery edge end of the through-hole in the end plate portion and an outer periphery surface portion of the shaft end part of the motor shaft;
an annular contact seal having a flexible material for sealing a space between the inner periphery edge end of the through-hole and the outer periphery surface portion of the shaft end part in a position axially outside of the bearing;
an annular seal plate having a rigid material fixed to the end plate portion in a position axially outside of the contact seal so as to conceal a space between the inner periphery edge end of the through-hole and the shaft end part; and
a labyrinth seal for preventing ingress of cutting processing oil, the labyrinth seal being formed between the annular seal plate and the shaft end part of the motor shaft.

2. The motor with a cutting tool mounting hole according to claim 1, characterized in that:
the seal plate has a circular inner periphery end surface which coaxially encircles the circular outer periphery surface portion of the shaft end part of the motor shaft; and
the labyrinth seal has an extremely narrow circular groove formed between the circular inner periphery end surface and the circular outer periphery surface portion and extending in the axial direction.

3. The motor with a cutting tool mounting hole according to claim 1, characterized in that:
the seal plate has an annular plate portion which broadens in a radial direction and a cylindrical portion which extends bent at a right angle in the axial direction from an inner periphery edge of the annular plate portion;
the shaft end part of the motor shaft has a circular groove of a fixed width through which the cylindrical portion of the seal plate is coaxially inserted;
an extremely narrow circular groove for guiding the cutting processing oil along the axial direction in a first direction is formed in an inner periphery side of the cylindrical portion inserted into the circular groove;
an extremely narrow circular groove for guiding the cutting processing oil along the axial direction in a second direction opposite the first direction is formed in an outer periphery side of the cylindrical portion inserted into the circular groove; and
the labyrinth seal has said two circular grooves and a communicating groove that is broader than the circular grooves and communicates these circular grooves.

4. The motor with a cutting tool mounting hole according to claim 1, characterized in that:
the seal plate has an annular plate portion which broadens in a radial direction and a cylindrical portion which bends at a right angle toward the motor interior from an inner periphery edge of the annular plate portion and extends along the axial direction;
an annular holder plate for holding the cutting tool is coaxially fixed to the shaft end part of the motor shaft;
a circular groove of a fixed width through which the cylindrical portion of the seal plate is coaxially inserted is formed between the shaft end part and the annular holder plate;
an extremely narrow circular groove for guiding the cutting processing oil along the axial direction in a first direction is formed in an inner periphery side of the cylindrical portion inserted into the circular groove;
an extremely narrow circular groove for guiding the cutting processing oil along the axial direction in a second direction opposite the first direction is formed in an outer periphery side of the cylindrical portion inserted into the circular groove; and the labyrinth seal has said two cylindrical grooves and a communicating groove that is broader than the cylindrical grooves and communicate these circular grooves.

5. The motor with a cutting tool mounting hole according to claim 4, characterized in that:

the labyrinth seal has, between the annular holder plate and the seal plate, a circular groove which extends in the radial direction and is broader than the extremely narrow cylindrical grooves extending in the axial direction; and the circular groove extending in the radial direction communicates with one of the extremely narrow circular grooves extending in the axial direction.

* * * * *